United States Patent
Xue et al.

(10) Patent No.: US 10,612,358 B2
(45) Date of Patent: Apr. 7, 2020

(54) DIRECTIONAL DRILLING WITH STOCHASTIC PATH OPTIMIZATION OF OPERATING PARAMETERS

(71) Applicant: Halliburton Energy Services, Inc., Houston, TX (US)

(72) Inventors: Yuzhen Xue, Humble, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/550,467

(22) PCT Filed: Dec. 9, 2016

(86) PCT No.: PCT/US2016/065789
§ 371 (c)(1),
(2) Date: Aug. 11, 2017

(87) PCT Pub. No.: WO2018/106254
PCT Pub. Date: Jun. 14, 2018

(65) Prior Publication Data
US 2019/0284921 A1    Sep. 19, 2019

(51) Int. Cl.
*E21B 44/00* (2006.01)
*E21B 7/04* (2006.01)
(Continued)

(52) U.S. Cl.
CPC ............. *E21B 44/00* (2013.01); *E21B 7/04* (2013.01); *E21B 7/06* (2013.01); *E21B 41/00* (2013.01);
(Continued)

(58) Field of Classification Search
CPC ...... E21B 44/00; E21B 41/0092; E21B 44/04; E21B 45/00; E21B 47/024; E21B 49/00
(Continued)

(56) References Cited

U.S. PATENT DOCUMENTS

5,103,920 A * 4/1992 Patton ............... E21B 47/02216
175/45
6,711,529 B1 * 3/2004 Thore .................... G01V 11/00
703/2
(Continued)

*Primary Examiner* — Brian S Cook
(74) *Attorney, Agent, or Firm* — Jason Sedano; Parker Justiss, P.C.

(57) ABSTRACT

A disclosed drilling method includes: obtaining a formation model representing formation properties to be encountered by a drilling assembly being steered towards a target; identifying at least one path-dependent drilling dynamics model for predicting the drilling assembly's response to one or more operating parameters; characterizing uncertainties associated with said formation model and said at least one drilling dynamics model, said characterizing yielding a probability density function for each uncertainty; representing an acceptable range for each of said one or more operating parameters as a probability density function; employing the probability density functions to determine random samples of said uncertainties and of said one or more operating parameters; applying a cost function to the random samples to determine an expected cost as a function said one or more operating parameters; and displaying the randomly sampled operating parameters having a minimum expected cost as optimized operating parameters.

24 Claims, 3 Drawing Sheets

(51) Int. Cl.
*E21B 41/00* (2006.01)
*E21B 44/04* (2006.01)
*E21B 45/00* (2006.01)
*E21B 47/024* (2006.01)
*E21B 49/00* (2006.01)
*G06Q 30/02* (2012.01)
*E21B 7/06* (2006.01)

(52) U.S. Cl.
CPC .......... *E21B 41/0092* (2013.01); *E21B 44/04* (2013.01); *E21B 45/00* (2013.01); *E21B 47/024* (2013.01); *E21B 49/00* (2013.01); *G06Q 30/0283* (2013.01)

(58) Field of Classification Search
USPC .......................................................... 703/10
See application file for complete search history.

(56) References Cited

U.S. PATENT DOCUMENTS

| | | | |
|---|---|---|---|
| 8,364,404 B2* | 1/2013 | Legendre | G01V 1/50 |
| | | | 702/5 |
| 9,045,967 B2* | 6/2015 | Heliot | E21B 44/00 |
| 9,850,712 B2* | 12/2017 | Sugiura | E21B 7/04 |
| 2004/0154831 A1 | 8/2004 | Seydoux et al. | |
| 2010/0155142 A1 | 6/2010 | Thambynayagam et al. | |
| 2010/0271232 A1* | 10/2010 | Clark | E21B 47/02216 |
| | | | 340/853.2 |
| 2011/0172976 A1 | 7/2011 | Budiman et al. | |
| 2015/0369940 A1* | 12/2015 | WiiK | G01V 3/08 |
| | | | 702/7 |
| 2016/0230530 A1 | 8/2016 | Dykstra et al. | |
| 2016/0281489 A1 | 9/2016 | Dykstra et al. | |
| 2017/0370151 A1* | 12/2017 | Banirazi-Motlagh | ......... |
| | | | G05B 15/02 |

\* cited by examiner

DIRECTIONAL DRILLING WITH STOCHASTIC PATH OPTIMIZATION OF OPERATING PARAMETERS

CROSS-REFERENCE TO RELATED APPLICATION

This application is the National Stage of, and therefore claims the benefit of, International Application No. PCT/US2016/065789 filed on Dec. 9, 2016, entitled "DIRECTIONAL DRILLING WITH STOCHASTIC PATH OPTIMIZATION OF OPERATING PARAMETERS,". The above application is commonly assigned with this National Stage application and is incorporated herein by reference in its entirety.

BACKGROUND

Directional drilling is the process of steering a drill string, and hence the borehole. It can be achieved with a variety of drill string steering mechanisms, e.g., whipstocks, mud motors with bent-housings, jetting bits, adjustable gauge stabilizers, and rotary steering systems (RSS). Each of these mechanisms employs side force, bit tilt angle, or some combination thereof, to steer the drill string's forward and rotary motion. They may be used to avoid obstacles and reach desired targets, both of which may take various forms. For example, a target may be specified in terms of an entry point to a formation, together with a desired entry vector. Both the entry point and vector may be specified as ranges or accompanied by acceptable tolerances. Some boreholes may even be associated with a series of such entry points and vectors.

Drillers generally employ careful trajectory planning not only to ensure that targets are reached and obstacles avoided, but also to limit curvature and tortuosity of the borehole. Such limits are needed to prevent the drill string and other tubulars from getting stuck, to avoid excessive friction, and to minimize casing wear.

Trajectory planning is generally subject to information uncertainty from a number of sources. For example, the drill string continuously encounters formations whose precise properties are often not known in advance, but which affect the operation of the bit, or more precisely, affect the operating parameter ranges that induce bit whirl, stick-slip, vibration, and other undesirable behaviors, as well as affecting the relationship between those parameters and the ROP. The drilling dynamics model used to predict such behaviors might be mismatched with the physical drill string assembly. The formation heterogeneity may also be uncertain, as well as the precise positions of the formation boundaries and any detected formation anomalies. The operating parameters themselves may not be precisely known (e.g., rotations per minute (RPM), torque, hook load, weight on bit (WOB), downhole pressure, drilling fluid flow rate), whether due to inaccuracies in the control mechanisms or sensor noise. The steering mechanism may suffer from bit walk or other steering inaccuracies.

It is in this context of uncertainty that drillers must operate as they seek to reach their targets quickly and efficiently. Achieving this goal requires consideration of a surprising range of factors including rate of penetration (ROP), likelihood of equipment damage and commensurate non-productive time (NPT) spent on repairs, and other sources of NPT including tripping the bottomhole assembly (BHA), replacing worn bits, performing survey measurements, and recalibrating drilling subsystems. Drillers lack sufficient guidance for optimizing their operating parameters in the face of such complexity and uncertainty.

BRIEF DESCRIPTION OF THE DRAWINGS

Accordingly, there are disclosed herein directional drilling systems and methods employing stochastic path optimization of the operating parameters for drilling. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 1:
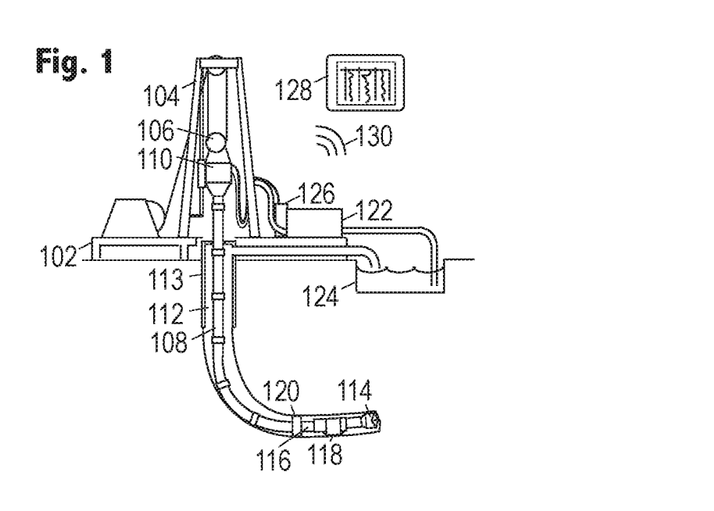
FIG. 1 is a schematic diagram of an illustrative well drilling environment.

To provide context and facilitate understanding of the present disclosure, FIG. 1 shows an illustrative drilling environment, in which a drilling platform 102 supports a derrick 104 having a traveling block 106 for raising and lowering a drill string 108. A top-drive motor 110 supports and turns the drill string 108 as it is lowered into the borehole 112. The drill string's rotation, alone or in combination with the operation of a downhole motor, drives the drill bit 114 to extend the borehole. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 8, through orifices in the drill bit 114, back to the surface via the annulus around the drill string 108, and into a retention pit 124. The drilling fluid transports cuttings from the borehole 112 into the retention pit 124 and aids in maintaining the integrity of the borehole. An upper portion of the borehole 112 is stabilized with a casing string 113 and the lower portion being drilled is open (uncased) borehole.

The drill collars in the BHA 116 are typically thick-walled steel pipe sections that provide weight and rigidity for the drilling process. The thick walls are also convenient sites for installing logging instruments that measure downhole conditions, various drilling parameters, and characteristics of the formations penetrated by the borehole. Among the drilling parameters typically monitored downhole are measurements of weight on bit (WOB), downhole pressure, and vibration or acceleration. Further downhole measurements may include torque and bending moments at the bit and at other selected locations along the BHA.

The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter module is located on or near the drilling platform 102 to complete the telemetry link. The most popular telemetry technique modulates the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing system (shown in FIG. 1 as a tablet computer 128) communicates with the surface interface 126 via a wired or wireless link 130, collecting and processing measurement data to generate logs and other visual representations of the acquired data and the derived models to facilitate analysis by a user. In at least some embodiments, the user may further employ the data processing system to send commands downhole to control the steering mechanism and/or to adjust the surface operating parameters. Representative surface operating parameters include: hook load, torque, rotations per minute (RPM), and rate of penetration (ROP).

The data processing system may take many suitable forms, including one or more of: an embedded processor, a desktop computer, a laptop computer, a central processing facility, and a virtual computer in the cloud. In each case, software on a non-transitory information storage medium may configure the processing system to carry out the desired processing, modeling, and display generation.

To assist the driller with steering the borehole along a desired trajectory, the BHA 116 may acquire various types of measurement data including multi-component measurements of the earth's magnetic field and gravitational field at each of a series of survey points (or "stations") along the length of the borehole. The survey points are typically those positions where the navigation tool is at rest, e.g., where drilling has been halted to add lengths of drill pipe to the drill string. The gravitational and magnetic field measurements reveal the slope ("inclination") and compass direction ("azimuth") of the borehole at each survey point. When combined with the length of the borehole between survey points (as measureable from the length added to the drill string), these measurements enable the location of each survey point to be determined using known techniques such as, e.g., the tangential method, the balanced tangential method, the equal angle method, the cylindrical radius of curvature method, or the minimum radius of curvature method, to model intermediate trajectories between survey points. When combined together, these intermediate trajectories form an overall borehole trajectory that may be, for example, compared with a desired trajectory or used to estimate relative positions of any desired targets and known obstacles.

Also among the various types of measurement data that may be acquired by the BHA 116 are caliper measurements, i.e., measurements of the borehole's diameter, optionally including the borehole's cross-sectional shape and orientation, as a function of position along the borehole. Such measurements may be combined with the trajectory information to model fluid flows, hole cleaning, frictional forces on the drill string, and stuck pipe probabilities.

Figure 2:
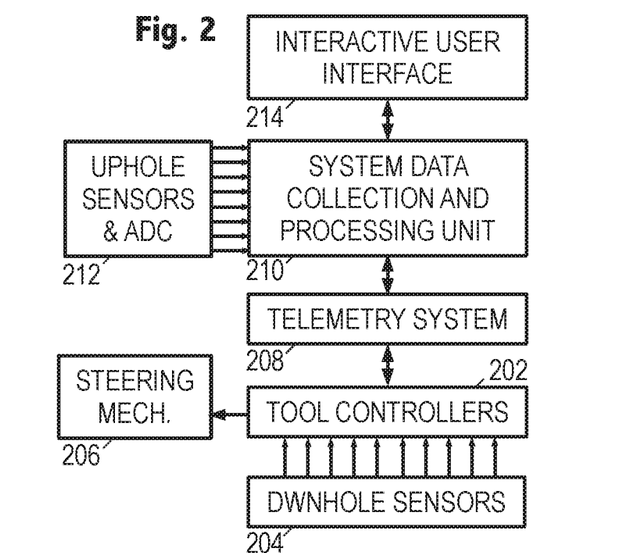
FIG. 2 is a function-block diagram of a logging while drilling (LWD) system.

FIG. 2 is a function-block diagram of an illustrative directional drilling system. One or more downhole tool controllers 202 collect measurements from a set of downhole sensors 204, preferably but not necessarily including navigational sensors, drilling parameter sensors, and formation parameter sensors, to be digitized and stored, with optional downhole processing to compress the data, improve the signal to noise ratio, and/or to derive parameters of interest from the measurements.

A telemetry system 208 conveys at least some of the measurements or derived parameters to a processing system 210 at the surface, the uphole system 210 collecting, recording, and processing measurements from sensors 212 on and around the rig in addition to the telemetry information from downhole. Processing system 210 generates a display on interactive user interface 214 of the relevant information, e.g., measurement logs, borehole trajectory, and recommended drilling parameters to optimize a trajectory subject to target tolerances, limits on tortuosity, and information uncertainty. The processing system 210 may further accept user inputs and commands and operate in response to such inputs to, e.g., control the operating parameters of the surface rig and transmit commands via telemetry system 208 to the tool controllers 202. Such commands may alter the settings of the steering mechanism 206.

The software that executes on processing systems 128 and/or 210, addresses the information uncertainty that is typically encountered in the drilling process. Prior to the borehole's completion there are many unknowns, including the environmental uncertainties (e.g., formation properties and boundary locations) and operational uncertainties (e.g., optimal values of operating parameters). If taking a deterministic approach (e.g., wherein the model is presumed accurate, and a fixed schedule is presumed for all events), drillers may follow trajectories having undue risk for high tortuosity, stuck pipe, poor formation contact, and rework.

Figure 3A:
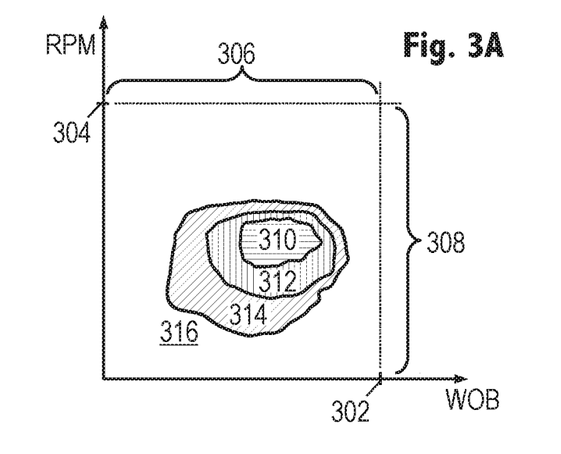
FIGS. 3A-3D schematically illustrate various forms of drilling operation uncertainty.

FIG. 3A illustrates a first type of operational uncertainty in the form of a map of behavior vs. RPM and WOB. Marked on the axes are the maximum design WOB 302 and the maximum design RPM 304, defining a WOB parameter range 306 and RPM parameter range 308. Within this range, the processing system has modeled the drilling operation to determine the likelihood of undesirable stick-slip behavior. Due to uncertainties in properties of the formation rock and in how well the drill string model matches the actual drill string, the regions are associated with probabilities derived from a probability distribution $\rho_0$. Region 310 represents the "good" region, where probability of stick-slip behavior is very low, e.g., less than 10%. Regions 312, 314, and 316 represent regions of increasing probability, with region 316 being the highest probability, e.g., higher than 90%. These regions are expected to vary for different formation properties, different inclinations, different degrees of bit wear, and with different degrees of model mismatch as additional information is obtained and the model is refined.

Figures 3B, 3C, 3D:
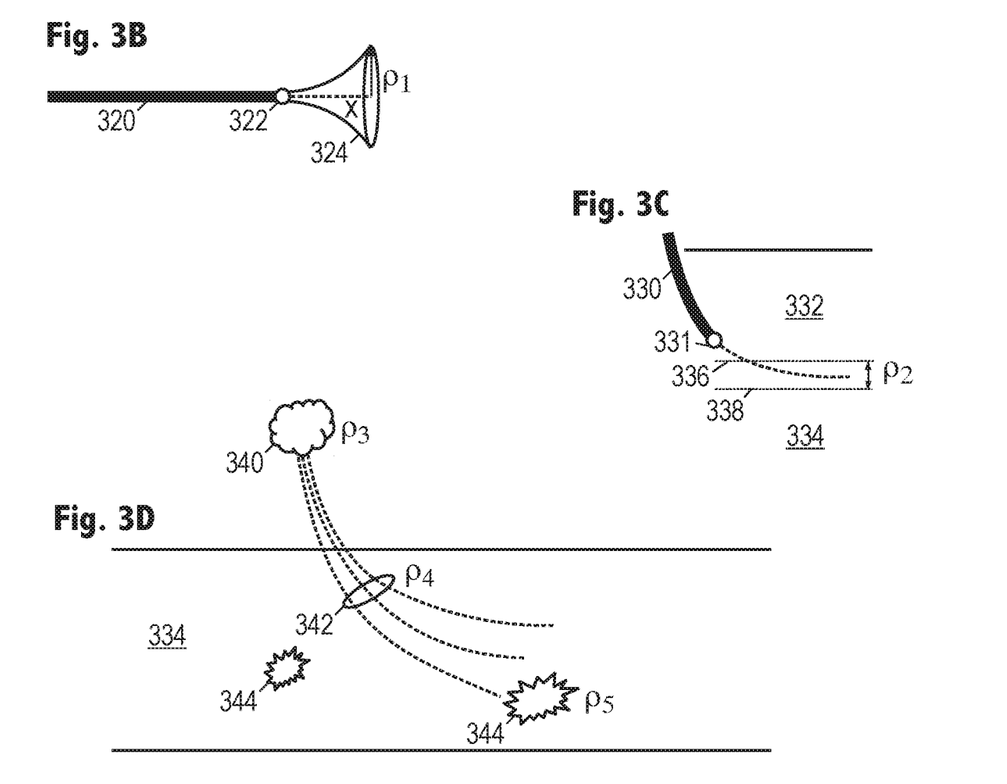

FIG. 3B illustrates a second type of operational uncertainty known as "bit walk". FIG. 3B shows a straight "ideal" borehole 320 that the driller seeks to extend along a straight trajectory from end point 322. Even under such idealized circumstances, the actual trajectory 324 may wander off track due to imbalances in the bit-rock interaction forces. The rate at which this occurs exhibits a degree of uncertainty that is often represented by a Gaussian probability distribution $\rho_1$, which can be defined in terms of a mean and variance, which may vary with the operating parameters. The mean and variance can be derived by statistical methods, e.g. hypothesis test.

FIG. 3C illustrates a first type of environmental uncertainty. A borehole 330 has been drilled to a point 331 within a formation bed 332 adjacent to a reservoir 334. The driller seeks to extend the borehole along a trajectory below and parallel to the reservoir boundary. However, because the borehole 330 has not yet reached the boundary, the precise boundary position remains uncertain. If the borehole turns too soon (because the driller believes the boundary is at position 336, while it is actually at position 338), the borehole may miss the reservoir until corrective action can be taken. The boundary position uncertainty may be represented by a Gaussian probability distribution $\rho_2$ with a variance that may vary based on how close point 331 is to the boundary.

FIG. 3D illustrates other types of uncertainty. Operating parameter uncertainties 340, represented as having a probability distribution $\rho_3$, arise from causes such as measurement noise. Inaccuracies in the navigational sensors cause uncertainty in the precise location and shape of the borehole trajectory 342, represented here as having a probability distribution $\rho_4$. The degree and distribution of heterogeneity in the formation may also be treated as probabilistic distribution $\rho_5$.

The various uncertainty sources and their probability distributions can be determined based on historical data and experience, as well as studies of the models for the drilling systems and formation. It is believed that it is beyond the ability of humans, even well trained ones, to optimize the drilling path in the presence of such uncertainties.

The software that executes on processing systems 128 and/or 210, addresses this information uncertainty and recommends operating parameter values that are optimized in real time. The software employs a novel, automatic stochastic path optimization method to find the optimal values in the presence of the uncertainty.

Figure 4:
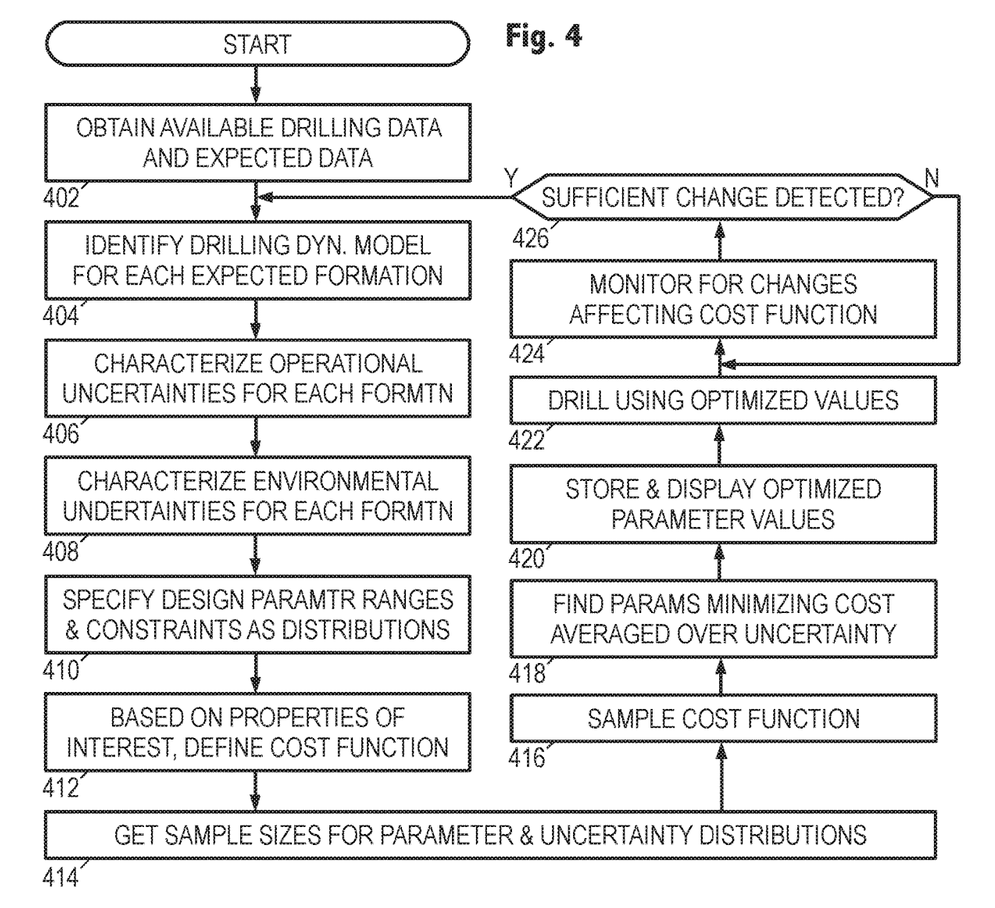
FIG. 4 is a flow diagram of an illustrative directional drilling method.

The method implemented by the software begins in block 402, where it retrieves the available historical and real time drilling data (e.g., logs of operating parameters and formation properties for the current well and any surrounding wells) and expected data (e.g., formation models and drilling system models to provide estimated responses to programmable inputs). General empirical data on the drilling system design and behavior may also be gathered and employed to customize the drilling system model and aid in analyzing sources of uncertainty.

In block 404 the software-configured processing system identifies from the formation model the estimated formation properties of each bed between the current endpoint of the borehole and the directional drilling target. Based on these formation properties, an estimated inclination of the bottomhole assembly as it encounters each bed, and the anticipated configuration of the steering mechanism, the processing system determines a drilling dynamics model for each formation bed. Such models may be derived from first principles, based on historical data, or derived from some combination of these.

Using these models, the processing system determines probability distributions of the operational uncertainties, including such uncertainties as bit walk, sensor noise for operational parameters, and maps of drilling behavior versus operational parameter values. These uncertainties are defined or expressed as a function of the operational parameters making up the operational space, and their impact on the system's behavior using a model-sensitivity analysis. The model sensitivity analysis characterizes how inaccuracies in the model and inputs would translate into variations of the behavior map. Thus the operational regions illustrated in FIG. 3A may shrink and change as such uncertainties are accounted for. The uncertainties for other performance maps may be similarly analyzed, e.g. a map of ROP versus hook load and top drive torque.

In block 408, the processing system determines probability distributions for the environmental uncertainties of each formation bed between the current endpoint of the borehole and the directional drilling target. Such environmental uncertainties include position uncertainty of the boundaries, position uncertainty of the trajectory, uncertainty of precise formation properties (e.g., rock strength) and heterogeneity, and position uncertainty of any detected formation anomalies. Typically the environmental uncertainties are embedded in the drilling process and cannot be directly mitigated, though they may be expected to vary with position and generally decrease as the endpoint approaches the region in question.

In block 410, the processing system determines constraints and ranges of design parameters, and defines probability distributions to represent these constraints. For example, the mechanical limits for the hook load and top drive torque are determined and represented using a uniform probability distribution below those limits (or another customized distribution that may provide reduced probabilities for parameter values approaching the limits. Other performance limits (such as a fatigue failure limit) and constraints on path design parameters may be similarly characterized as probability distributions. For example, customized probability distributions may be used to keep the toolface adjustment and dogleg severity within certain ranges to meet path shape requirements.

In block 412, the processing system determines the properties of interest and, based thereon, defines a cost function to be optimized. The cost function is likely to be adjusted as the drilling process progresses. In at least some embodiments, the cost function, $J(\xi,\theta)$, is a weighted sum of various optimization merits. For example, it can include the energy dissipation ratio, the bit wear, the mud motor wear, the cutting efficiency, the rate of penetration, the financial cost, a vibration excitation metric, and the quantified path geometry. The cost function is a function of the vector $\theta$, representing the operational parameter values (such as hook load and topdrive torque) and the path design parameters (such as toolface and dogleg severity) that are to be optimized. The cost function further depends on the vector $\xi$, representing the operational and environmental uncertainties acting on the system. The optimal values of operational and path design parameters, $\theta^*$, are those that, in the expectation sense, optimize the cost function under the previously identified probability distributions $\rho$. In equation form, $$\theta^* = \min_{\theta \in \Theta}\{E^\rho[J(\xi,\theta)]\}$$

where $E^\rho[\bullet]$ represents expected value given probability distributions $\rho$.

In block 414, the processing system determines a sample size, i.e., number of samples, to be used for estimating the optimal values $\theta^*$. Statistically sufficient sample sizes N and M for independent sampling of the vectors, $\xi$ and $\theta$, may be calculated based on the number of variables, the probability distributions, and the desired precision of the estimate for the optimal values. (The precision requirement may need to be relaxed if insufficient computational resources are available.) The sufficiency of the sample sizes may be confirmed through comparison with previous experiences or through the use of additional sampling to verify convergence of the estimates.

In block 416, the processing system uses the probability distributions to generate the N random samples of the uncertainty vector $\xi$ and the M random samples of the parameter vector $\theta$, and calculates the cost function value for each of the N*M combinations. In block 418, the processing system combines the cost function values to determine an expected cost function value for each sample of the parameter vector $\theta$, and thereafter identifies the parameter vector sample that minimizes the expected cost function. In equation form, $$\hat{\theta}_{NM} = \operatorname*{argmin}_{k=1\ldots M} \frac{1}{N} \sum_{i=1}^{N} J(\xi, \theta)$$

Suitable numerical optimization methods may be employed to reduce the computational requirements of this calculation.

In block 420, the processing system stores and displays the estimates of optimal operating parameter values. In block 422, drilling proceeds using, or at least guided by, the optimal parameter value estimates. As the drilling proceeds, one or more of the parameter uncertainties may be reduced, additional uncertainties may be discovered, or other additional information may become available. The processing system monitors the measurements and models for such developments and, in block 426, determines whether they affect the cost function, e.g., by adding terms to the weighted sum, eliminating terms from the weighted sum, or changing a magnitude of one of the terms by some predetermined fraction of the cost function's minimized value. If so, blocks 404-426 may be repeated to re-optimize the operating parameter value estimates based on the latest information.

The foregoing method implements a randomized algorithm (RA), the Monte Carlo method, to calculate the optimal operating and path design parameters in the presence of both operational and environmental uncertainties. It solves a stochastic optimization problem, resulting in the statistically best path considering the available uncertainty information. If new information becomes available, then the path is adaptively re-optimized. The disclosed numerical method approximates the best analytical solution, which may be otherwise infeasible to solve for the contemplated drilling systems. It explores path design possibilities based on the samples of operational and environmental uncertainties, and then it employs control synthesis to select an optimal path design parameter vector which optimizes the statistically average path.

Accordingly, the embodiments disclosed herein include:

Embodiment A: A drilling method that comprises: obtaining a formation model representing formation properties to be encountered by a drilling assembly being steered towards a target; identifying at least one path-dependent drilling dynamics model for predicting the drilling assembly's response to one or more operating parameters; characterizing uncertainties associated with said formation model and said at least one drilling dynamics model, said characterizing yielding a probability density function for each uncertainty; representing an acceptable range for each of said one or more operating parameters as a probability density function; employing the probability density functions to determine random samples of said uncertainties and of said one or more operating parameters; applying a cost function to the random samples to determine an expected cost as a function said one or more operating parameters; and displaying the randomly sampled operating parameters having a minimum expected cost as optimized operating parameters.

Embodiment B: A drilling system that comprises: a drilling assembly and a processing system. The drilling assembly includes: a bottomhole assembly with a drill bit and a steering assembly; and a drill string that connects the bottomhole assembly to a drilling rig. The processing system provides optimized values of operating parameters for steering the drilling assembly to a target, by: obtaining a formation model representing formation properties to be encountered by the drilling assembly; identifying at least one path-dependent drilling dynamics model for predicting the drilling assembly's response to the operating parameters; characterizing uncertainties associated with said formation model and said at least one drilling dynamics model, said characterizing yielding a probability density function for each uncertainty; representing an acceptable range for each of said operating parameters as a probability density function; employing the probability density functions to determine random samples of said uncertainties and of said operating parameters; applying a cost function to the random samples to determine an expected cost as a function said operating parameters; and displaying the randomly sampled operating parameters having a minimum expected cost as optimized values for the operating parameters.

Each of the foregoing embodiment may further include any of the following additional elements alone or in any suitable combination:

A borehole curvature logging system that includes: a drill string having a bottomhole assembly (BHA) with sensors providing actual deformation and bending moment measurements as a function of BHA position at spaced-apart intervals on the BHA; a processing system that retrieves said actual measurements and responsively generates a log of borehole curvature; and a user interface that displays the borehole curvature log. The processing system implements a method that generates the log by: providing an estimated borehole trajectory; deriving predicted deformation and bending moment measurements based on the estimated borehole trajectory; determining an error between the predicted measurements and the actual measurements; updating the estimated borehole trajectory to reduce the error; repeating said deriving, determining, and updating to refine the estimated borehole trajectory; and converting the estimated borehole trajectory into a borehole curvature log.

Embodiment B: A borehole curvature logging method that comprises: retrieving actual deformation and bending moment measurements for spaced-apart intervals on a bottomhole assembly (BHA) as a function of BHA position; obtaining an estimated borehole trajectory; deriving predicted deformation and bending moment measurements based on the estimated borehole trajectory; determining an error between the predicted measurements and the actual measurements; updating the estimated borehole trajectory to reduce the error; repeating said deriving, determining, and updating to refine the estimated borehole trajectory; converting the estimated borehole trajectory into a borehole curvature log for display or storage on a nontransient information storage medium.

Each of the foregoing embodiment may further include any of the following additional elements alone or in any suitable combination: 1. The method includes using the optimized operating parameters to steer the drilling assembly towards the target. 2. said one or more operating parameters include weight on bit and rotations per minute. 3. said one or more operating parameters include hook load and top drive torque. 4. said one or more operating parameters further include toolface orientation and dogleg severity. 5. at least some of said uncertainties are associated with: position of at least one formation bed boundary; formation rock hardness; and bit wear. 6. at least some of said uncertainties are associated with: formation heterogeneity;

and position of one or more formation anomalies. 7. at least some of said uncertainties are associated with: sensor measurements of said one or more operating parameters; bit walk rate; and accuracy of the at least one path-dependent drilling dynamics model. 8. the cost function is a weighted sum of optimization merits including one or more of: energy dissipation ratio, bit wear, mud motor wear, cutting efficiency, rate of penetration, financial cost, vibration excitation, and quantified path geometry. 9. The method further includes: monitoring drilling data to refine the formation model and the drilling dynamics model; and repeating said identifying, characterizing, representing, employing, applying, and displaying.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A drilling method that comprises:
   obtaining a formation model representing formation properties to be encountered by a drilling assembly being steered towards a target;
   identifying at least one path-dependent drilling model for predicting the drilling assembly's response to one or more operating parameters, wherein each of the at least one path-dependent drilling models is based on formation properties of each formation bed identified by the formation model;
   characterizing uncertainties associated with said formation model and said at least one drilling model, said characterizing yielding a probability density function for each uncertainty; and
   representing an acceptable range for each of said one or more operating parameters as a probability density function.

2. The drilling method of claim 1, further comprising:
   employing the probability density functions to determine random samples of said uncertainties and of said one or more operating parameters; and
   applying a cost function to the random samples to determine an expected cost as a function said one or more operating parameters.

3. The drilling method of claim 2, further comprising:
   displaying the randomly sampled operating parameters having a minimum expected cost as optimized operating parameters.

4. The method of claim 3, further comprising using the optimized operating parameters to steer the drilling assembly towards the target.

5. The method of claim 3, wherein said one or more operating parameters include weight on bit and rotations per minute.

6. The method of claim 3, wherein said one or more operating parameters include hook load and top drive torque.

7. The method of claim 3, wherein said one or more operating parameters further include toolface orientation and dogleg severity.

8. The method of claim 1, wherein at least some of said uncertainties are associated with:
   position of at least one formation bed boundary;
   formation rock hardness; and
   bit wear.

9. The method of claim 1, wherein at least some of said uncertainties are associated with:
   formation heterogeneity; and
   position of one or more formation anomalies.

10. The method of claim 1, wherein at least some of said uncertainties are associated with:
    sensor measurements of said one or more operating parameters;
    bit walk rate; and
    accuracy of the at least one path-dependent drilling model.

11. The method of claim 3, wherein the cost function is a weighted sum of optimization merits including one or more of: energy dissipation ratio, bit wear, mud motor wear, cutting efficiency, rate of penetration, financial cost, vibration excitation, and quantified path geometry.

12. The method of claim 3, further comprising:
    monitoring drilling data to refine the formation model and the drilling model; and
    repeating said identifying, characterizing, representing, employing, applying, and displaying.

13. A drilling system that comprises:
    a drilling assembly including:
      a bottomhole assembly with a drill bit and a steering assembly; and
      a drill string that connects the bottomhole assembly to a drilling rig; and
    a processing system that provides optimized values of operating parameters for steering the drilling assembly to a target, by:
      obtaining a formation model representing formation properties to be encountered by the drilling assembly;
      identifying at least one path-dependent drilling model for predicting the drilling assembly's response to the operating parameters, wherein each of the at least one path-dependent drilling models is based on formation properties of each formation bed identified by the formation model;
      characterizing uncertainties associated with said formation model and said at least one drilling model, said characterizing yielding a probability density function for each uncertainty; and
      representing an acceptable range for each of said operating parameters as a probability density function.

14. The drilling system of claim 13, wherein the processing system further provides optimized values by:
    employing the probability density functions to determine random samples of said uncertainties and of said operating parameters; and
    applying a cost function to the random samples to determine an expected cost as a function said operating parameters.

15. The drilling system of claim 14, wherein the processing system provides optimized values by further:
    displaying the randomly sampled operating parameters having a minimum expected cost as optimized values for the operating parameters.

16. The system of claim 13, wherein the drilling assembly uses the optimized values of operating parameters to steer the drilling assembly towards the target.

17. The system of claim 13, wherein said one or more operating parameters include weight on bit and rotations per minute.

18. The system of claim 13, wherein said one or more operating parameters include hook load and top drive torque.

19. The system of claim 18, wherein said one or more operating parameters further include toolface orientation and dogleg severity.

20. The system of claim 13, wherein at least some of said uncertainties are associated with:
   position of at least one formation bed boundary;
   formation rock hardness; and
   bit wear.

21. The system of claim 13, wherein at least some of said uncertainties are associated with:
   formation heterogeneity; and
   position of one or more formation anomalies.

22. The system of claim 13, wherein at least some of said uncertainties are associated with:
   sensor measurements of said one or more operating parameters;
   bit walk rate; and
   accuracy of the at least one path-dependent drilling model.

23. The system of claim 14, wherein the cost function is a weighted sum of optimization merits including one or more of: energy dissipation ratio, bit wear, mud motor wear, cutting efficiency, rate of penetration, financial cost, vibration excitation, and quantified path geometry.

24. The system of claim 15, wherein the processing system further provides the optimized values by:
   monitoring drilling data to refine the formation model and the drilling model; and
   repeating said identifying, characterizing, representing, employing, applying, and displaying.

* * * * *

UNITED STATES PATENT AND TRADEMARK OFFICE
CERTIFICATE OF CORRECTION

PATENT NO. : 10,612,358 B2
APPLICATION NO. : 15/550467
DATED : April 7, 2020
INVENTOR(S) : Yuzhen Xue and Jason D. Dvkstra

Page 1 of 1

It is certified that error appears in the above-identified patent and that said Letters Patent is hereby corrected as shown below:

In the Specification

Column 7, approximately Lines 11-12, delete " $\hat{\theta}_{NM} = \operatorname*{argmin}_{k=1...M} \frac{1}{N} \sum_{i=1}^{N} J(\xi, \theta)$ " and insert -- $\hat{\theta}_{NM} = \operatorname*{argmin}_{k=1..M} \frac{1}{N} \sum_{i=1}^{N} J(\xi, \theta)$ --

Signed and Sealed this
Seventh Day of July, 2020

Andrei Iancu
*Director of the United States Patent and Trademark Office*